United States Patent [19]
Glover et al.

[11] Patent Number: 6,040,776
[45] Date of Patent: *Mar. 21, 2000

[54] COLLECTION OF PROCESS EFFLUENT

[75] Inventors: Edward Charles Glover, London; Martyn Stuart Glover, Watford, both of United Kingdom

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/633,236

[22] Filed: Apr. 16, 1996

[30] Foreign Application Priority Data

Apr. 18, 1995 [GB] United Kingdom ............... 9507844

[51] Int. Cl.[7] ................................................ G08B 21/00
[52] U.S. Cl. ..................... 340/618; 340/619; 340/620; 340/623; 340/616; 340/614; 73/304 R; 73/304 C; 73/305; 222/51; 137/557
[58] Field of Search .................................. 340/618, 619, 340/620, 623, 603, 616, 614; 73/304 R, 304 C, 305; 222/51, 67, 386.5; 137/557, 554

[56] References Cited

U.S. PATENT DOCUMENTS

| | | | |
|---|---|---|---|
| 3,220,258 | 11/1965 | Rob | 340/618 |
| 3,477,460 | 11/1969 | Dotto | 340/620 |
| 3,589,862 | 6/1971 | Veloz | 222/386.5 |
| 3,931,818 | 1/1976 | Goldowsky | 222/67 |
| 4,354,180 | 10/1982 | Harding | 340/619 |
| 4,392,128 | 7/1983 | Young et al. | 340/616 |
| 4,745,293 | 5/1988 | Christensen | 250/577 |
| 5,028,910 | 7/1991 | Meacham et al. | 340/616 |
| 5,199,594 | 4/1993 | Obara et al. | 220/403 |

FOREIGN PATENT DOCUMENTS

| | | | |
|---|---|---|---|
| 0 227 358 B1 | 12/1986 | European Pat. Off. | G03C 3/06 |
| 0 500 371 A2 | 2/1992 | European Pat. Off. | G03D 3/06 |
| 2647919 | 5/1990 | France | G03D 3/06 |
| 1363136 | 8/1970 | United Kingdom | G03D 3/06 |

*Primary Examiner*—Julie Lieu
*Attorney, Agent, or Firm*—Charles E. Snee, III; Thomas H. Close; Gordon M. Stewart

[57] ABSTRACT

Described herein is an alarm system for use with a 'bag-in-box' arrangement (10) which is used to collect effluent from a processing apparatus (20). The alarm system comprises a chamber (50) located between the processing apparatus (20) and the 'bag-in-box' arrangement (10) which includes a level sensor (52) which indicates that the 'bag-in-box' arrangement (10) has been overfilled by a predetermined amount and is ready for changing.

16 Claims, 2 Drawing Sheets

COLLECTION OF PROCESS EFFLUENT

FIELD OF THE INVENTION

The present invention relates to improvements relating to the collection of process effluent and is more particularly concerned with flexible containers which are used both to supply solution to a processing apparatus and to collect effluent therefrom.

BACKGROUND OF THE INVENTION

Level sensors are well known for detecting the level of a solution in a container. These sensors can operate to detect the level of solution either as a full container is emptied or as an empty container is filled.

PROBLEM TO BE SOLVED BY THE INVENTION

However, it is not convenient to utilize level sensors in all types of flexible container, particularly with 'bag-in-box' arrangements which comprise an outer container inside which a flexible bag is located. 'Bag-in-box' arrangements are substantially sealed units with a single connector extending between the inner bag and the outside of the outer box to provide fluid communication between the bag and the exterior of the 'bag-in-box' arrangement.

Moreover, particularly in 'bag-in-box' arrangements where solutions are supplied to a processing apparatus, and once emptied, the 'bag-in-box' arrangement is re-used to collect effluent from the process, the 'bag-in-box' arrangement may be overfilled with the effluent to bursting point unless an alarm is given to an operator indicating that the 'bag-in-box' arrangement needs changing.

In some stages of a photographic processing apparatus, for example, the fixing stage, more volume of solution comes out of the stage than is input into that stage. This is due in part to the carry over of solution from a previous stage being greater than the carry out from that stage, and to the shrinkage of a part of the material during processing in that stage. This causes the 'waste' 'bag-in-box' arrangement for collecting the effluent to become full before the 'supply' 'bag-in-box' arrangement is fully emptied. If there are no spare empty 'bag-in-box' arrangements, the operator disconnects the partially emptied 'supply' 'bag-in-box' arrangement from the inlet side to the processing apparatus and connects it to the outlet side for collection of the effluent. However, the volume of effluent to be collected is now greater than the original volume of the 'supply' 'bag-in-box' arrangement and there is a build-up of excess solution in the 'bag-in-box' arrangement. Ideally, the 'supply' 'bag-in-box' arrangement should be emptied before the 'waste' 'bag-in-box' arrangement is full.

SUMMARY OF THE INVENTION

It is an object of the present invention to provide an alarm system for use with a flexible container, and in particular, a 'bag-in-box' arrangement which is used to collect effluent from a processing apparatus which provides an indication that either the flexible container or 'bag-in-box' arrangement has been filled to a predetermined limit and needs changing and/or there is something else wrong with the collection system.

In accordance with one aspect of the present invention, there is provided an alarm system for use with a sealed flexible container used to collect effluent solution from a processing apparatus, the system comprising:

a pipe to connecting the flexible container and the processing apparatus; and sensor means operating in the pipe means for determining the level of solution therein and for providing an alarm signal when the level of solution has reached a predetermined limit;

characterized in that the sensor means provides an alarm signal once the flexible container has been overfilled by a predetermined amount.

By the term 'flexible container' is meant any sealed container where no air enters as solution is withdrawn therefrom or added thereto. This includes, in particular, 'bag-in-box' arrangements which comprise an outer liquid-tight container inside which a flexible bag is located as described previously.

ADVANTAGEOUS EFFECT OF THE INVENTION

Using an alarm system in accordance with the present invention, a flexible container or 'bag-in-box' arrangement connected to the effluent side of a processing apparatus can be overfilled to a safe level before it is necessary to change it.

Furthermore, the system can also give an indication that there is a problem with a drain pipe on the outlet side of the process, for example, if the drain pipe is blocked or kinked, if there is no flexible container or 'bag-in-box' arrangement connected, or if the connection between the flexible container or 'bag-in-box' arrangement and the drain pipe has not been correctly made.

BRIEF DESCRIPTION OF THE DRAWINGS

For a better understanding of the present invention, reference will now be made, by way of example only, to the accompanying drawings in which.

DETAILED DESCRIPTION OF THE INVENTION

The present invention is applicable to flexible containers as described above, and will be described in more detail with reference to 'bag-in-box' arrangements, each having a self-sealing, dry-break connector through which fluid connection is made. However, it will be readily appreciated that the present invention is not limited to use with such 'bag-in-box' arrangements and can be used with any flexible container which can be overfilled by a predetermined amount.

Figure 1:
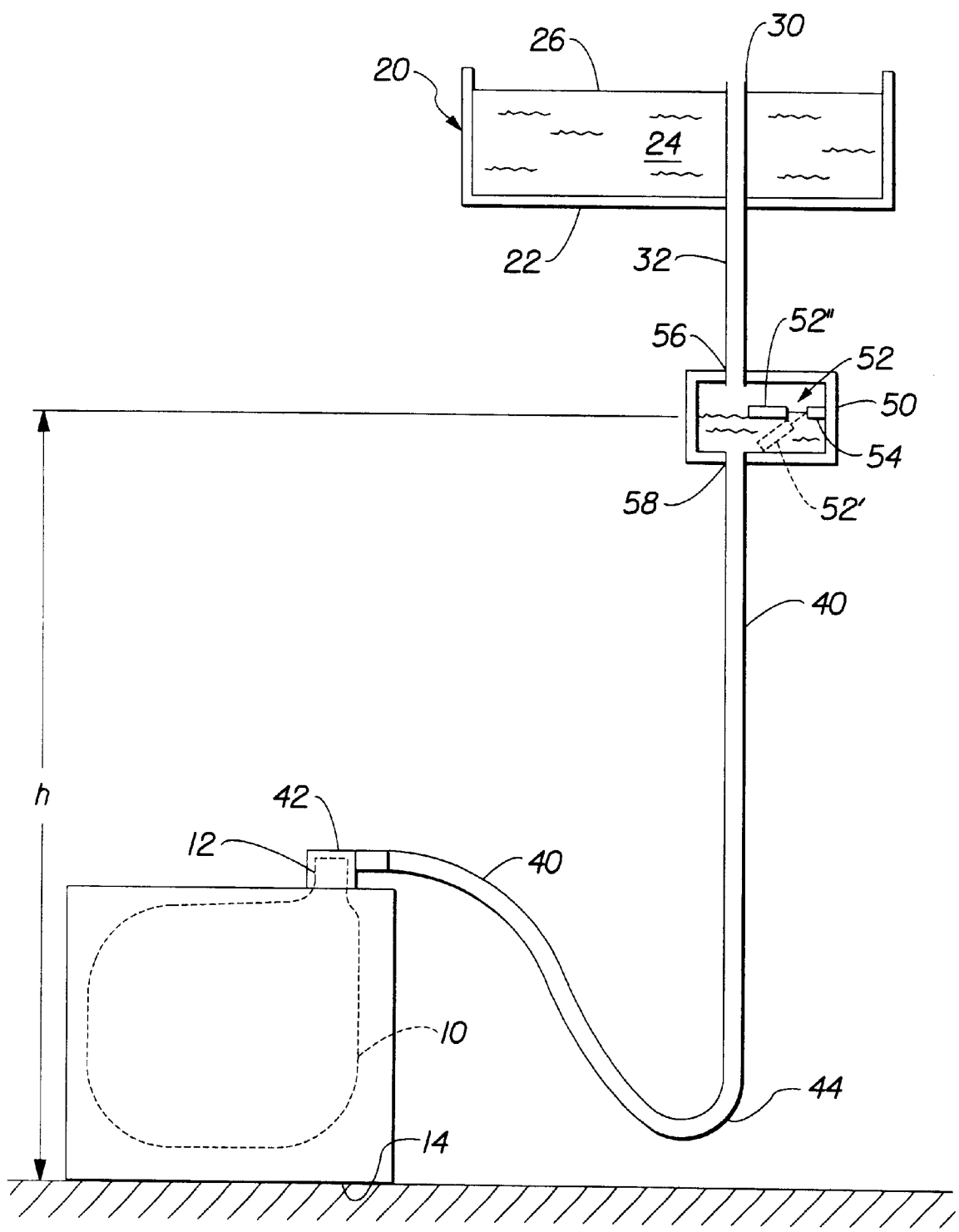
FIG. 1 is a schematic illustration of a level sensor arrangement forming part of an alarm system in accordance with the present invention.

FIG. 1 shows a 'bag-in-box' arrangement 10 connected to the outlet side of a processing apparatus 20. The processing apparatus 20 is shown as a processing tank 22 containing processing solution 24 at a level 26. Level 26 is determined by the position of end 30 of a waste pipe 32 within the tank 22.

'Bag-in-box' arrangement 10 is connected to pipe 40 by means of a two-part 'dry-break' connector 12, 42 which seals both the 'bag-in-box' arrangement 10 (portion 12) once it is disconnected from the pipe 40, and an outlet end of pipe 40 (portion 42) to prevent solution from leaking out when there is no 'bag-in-box' arrangement connected thereto.

Pipe 40 includes a 'U bend' portion 44 which operates as an air trap to prevent air from entering 'bag-in-box' arrangement 10 through connector 12. When a full 'bag-in-box' arrangement 10 is changed for an empty one, the empty 'bag-in-box' arrangement may be under negative pressure as it has just been disconnected from an inlet side of the processing apparatus (not shown). As the empty 'bag-in-box' arrangement is connected to pipe 40 by connector 12, a small volume of solution will enter the 'bag-in-box' arrangement on connection.

'U bend' portion 44 is always kept full of solution so that no air can enter the empty 'bag-in-box' arrangement on connection to end 42 of pipe 40. It will be appreciated that if air enters the 'bag-in-box' arrangement, it cannot be filled with the required volume of effluent solution from the outlet side of the processing apparatus 20.

Waste pipe 32 is connected to a chamber 50 which includes a rocking arm magnetic solution level switch 52 and a sensor 54 which senses the position of the switch 52. Chamber 50 has an inlet 56 connected to pipe 32 and an outlet 58 connected to pipe 40.

As shown, switch 52 is normally in the position indicated in dotted lines, 52', that is, in an 'open' position, and allows solution to flow freely from the tank 22 through chamber 50, into pipe 40, through 'U bend' portion 44, and into 'bag-in-box' arrangement 10.

However, when 'bag-in-box' arrangement 10 becomes full, solution backs up pipe 40 into chamber 50 causing switch 52 to rise to a 'closed' position, 52", shown in solid lines. The sensor 54 senses the level of solution due to closure of the switch 52 and provides an alarm signal.

Chamber 50 and switch 52 are located at a position relative to the 'bag-in-box' arrangement 10 so that the alarm is given when switch 52 is closed and is at a height h above base 14 of 'bag-in-box' arrangement 10. In this position, the solution has backed up pipe 40 from 'bag-in-box' arrangement 10 producing a pressure head determined by height h. At this point, the 'bag-in-box' arrangement 10 will have been correctly overfilled and is ready to be changed.

The alarm system in accordance with the present invention has the advantage of being able to monitor several conditions with the use of a single sensor. It is also provides a simple and low cost method of sensing an overfull or blocked pipe.

Naturally, other means can be used to sense the overfilling of the 'bag-in-box' arrangement. For example, there may be no necessity for the provision of a chamber including a switch to sense the overfilling of the 'bag-in-box' arrangement as described above.

In such a case, the waste pipe may be include an optical sensing arrangement for sensing the height to which the effluent has backed up the waste pipe once the 'bag-in-box' arrangement has been overfilled by a predetermined amount. Optical sensing arrangements are illustrated in FIGS. 2 to 5.

Figure 2:
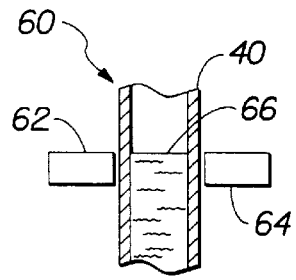
FIG. 2 is a schematic illustration of one embodiment of an optical sensor arrangement for use in the system shown in FIG. 1.

In FIG. 2, a transparent portion 60 of pipe 40 is shown. The location of the transparent portion 60 along pipe 40 is determined by the height h as described in relation to FIG. 1. A source of optical radiation 62 is located on one side of this portion 60 of the pipe 40. An optical sensor 64, sensitive to the radiation provided by the source 62, is located on the other side of portion 60, the radiation from source 62 passing through portion 60 to sensor 64. When the solution in the pipe 40 reaches a level indicated by 66, the amount of radiation received by the sensor 64 changes due to absorption etc. by the solution. When this change occurs, an output signal is produced indicating that the solution has reached height h.

Figure 3:
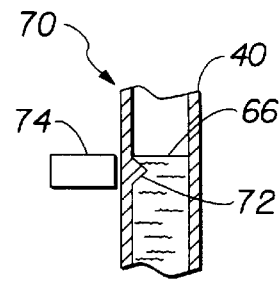
FIG. 3 is a schematic illustration of a second embodiment of an optical sensor arrangement for use in the system shown in FIG. 1.

FIG. 3 illustrates another optical sensor arrangement which operates by reflection. In this arrangement, a transparent portion 70 of pipe 40 located at height h as discussed above, has a modified internal wall 72. A combined radiation source/sensor 74 is located outside the pipe 40 but in the vicinity of the modified internal wall 72. This is shown in more detail in FIG. 4.

Figure 4:
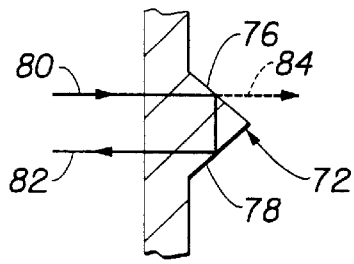
FIG. 4 is an enlarged view of a portion of the optical sensor arrangement shown in FIG. 3.

In FIG. 4, wall portion 72 comprises two surfaces 76, 78 which are angled with respect to one another. The angle between the surfaces 76, 78 is chosen so that incident radiation 80 from the source/sensor 74 is reflected by surface 76 onto surface 78 and is then reflected back to the source/sensor 74, shown by beam 82, by surface 78 when no solution is present in pipe 40. When the level of solution rises, as indicated by level 66 in FIG. 3, the incident radiation 80 is no longer reflected at surface 76 and is transmitted into the solution (not shown) as shown by dotted lines labelled 84. This means that reflected radiation 82 received by source/sensor 74 is at a substantially lower level than when there is no solution present. This change in reflected radiation is detected by the source/sensor 74 and an output signal generated indicating that solution has reached the predetermined height h in pipe 40.

Naturally, the transparent portion 70 of the pipe for this embodiment is chosen so that its refractive index allows reflection of the incident radiation 82 when no solution is present and transmission through the solution when it is present.

It will be appreciated that, although a single source/sensor 74 has been described with reference to FIGS. 3 and 4, a separate source and sensor could be utilized.

Figure 5:
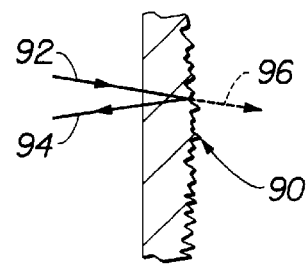
FIG. 5 is an enlarged view of an alternative arrangement to FIG. 4.

FIG. 5 illustrates another modified internal wall 90 which can be used in the embodiment shown in FIG. 3. Here, the wall 90 is chosen so that incident radiation 92 is scattered and/or reflected back to the sensor, as shown by beam 94, when no solution is present, the radiation 96 passing into the solution when it is present. As before, a suitable material is chosen for wall 90 so that a change in reflection/scattering can be determined.

Figure 6:
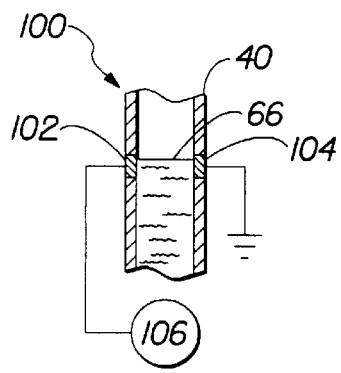
FIG. 6 is a schematic illustration of a capacitive sensor arrangement for use in the system shown in FIG. 1.

Alternatively, capacitance means could also be employed on the waste pipe for sensing the level of the solution therein. FIG. 6 shows a portion 100 of pipe 40 which has two metallic plates 102, 104 located therein. Plate 104 is earthed as shown and plate 102 is connected to a suitable detector 106 which can sense differences in capacitance across the plates 102, 104. When solution in pipe 40 reaches level 66, a change in capacitance is measured by detector 106.

Figure 7:
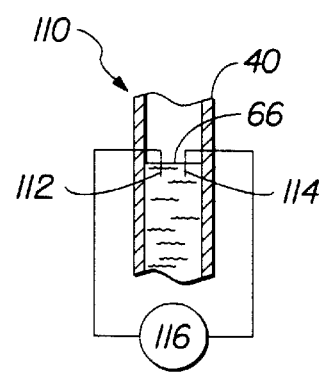
FIG. 7 is a schematic illustration of a conductive sensor arrangement for use in the system shown in FIG. 1.

By appropriate design of the drain pipe 40, it may be possible to incorporate conductivity measurements to determine the amount of overfilling of the 'bag-in-box' arrangement. This may require that the conductivity sensor be shielded from the solution passing through the drain pipe until a predetermined level is reached where the level of solution is such that the shielding is by-passed. A vent may also need to be included in the shielding arrangement so that there is no pressure build-up therein. FIG. 7 illustrates a simple conductive sensor arrangement.

In FIG. 7, a portion 110 of pipe 40 is modified to include two electrode members 112, 114 which pass through into the centre of the pipe 40. The electrode members 112, 114 are connected to a detector arrangement 116 which senses when an electrical circuit has been completed by the presence of the solution at level 66. The detector arrangement 116 includes a suitable electrical power source (not shown).

It may also be possible to measure an increase in pressure at the bottom of the drain pipe to provide the required amount of overfilling. However, it would be necessary to ensure that no air is trapped in the pipe. This is illustrated by FIGS. 8 and 9.

Figure 8:
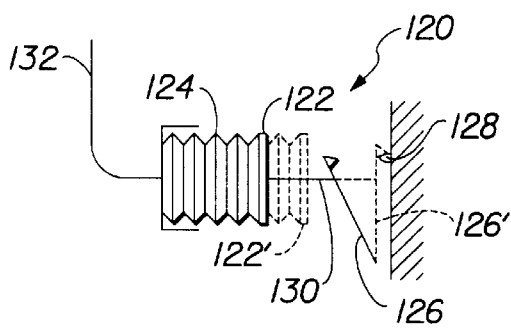
FIG. 8 is a schematic illustration of one embodiment of a pressure sensor arrangement for use in the system shown in FIG. 1.

In FIG. 8, a pressure-sensitive arrangement 120 is shown. This comprises a plate 122 mounted on bellows 124. An actuating arm 126 of a microswitch 128 is connected to the plate 122 by member 130. Connection is made to pipe 40 by conduit 132. In the position shown in solid lines, the pressure in pipe 40 is that when the 'bag-in-box' arrangement is not overfilled. As soon as the 'bag-in-box' arrangement is overfilled, bellows 124 expand moving plate 122 to the position shown in dotted lines, 122'. As the plate moves, actuating arm 126 is moved to the position indicated by 126' making contact with microswitch 128. This generates a signal indicating that the 'bag-in-box' arrangement has been overfilled by the predetermined amount.

Figure 9:
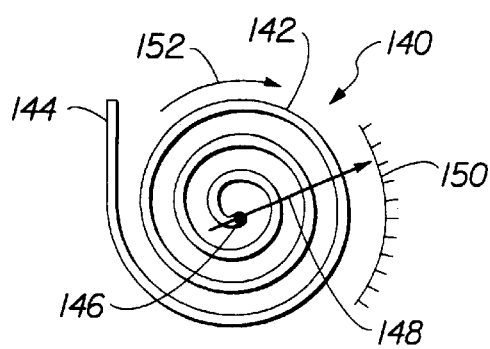
FIG. 9 is a schematic illustration of a second embodiment of a pressure sensor arrangement for use in the system shown in FIG. 1.

The arrangement 140 shown in FIG. 9 operates on a similar principle to the arrangement in FIG. 8. In this case, a coiled tube 142 is connected to pipe 40 by one end 144. The other end 146 of the tube 142 carries a pointer 148 which is movable over a fixed scale 150. As the pressure increases in the tube 142, end 146 uncoils in the direction indicated by arrow 152 and moves pointer 148 over scale 150 to provide a pressure reading.

Naturally, it will be appreciated that scale 150 can be replaced with a microswitch which triggers when the 'bag-in-box' arrangement has been overfilled by a predetermined amount, pointer 148 acting as an actuating arm for the microswitch.

Instead of determining the level of solution in the drain pipe to provide an indication that the 'bag-in-box' arrangement has been overfilled to the desired amount, it may be suitable to measure the 'bag-in-box' arrangement itself to determine when it has been overfilled by the desired amount, for example, the 'bag-in-box' arrangement could be weighed or physically measured.

The present invention is particularly useful in a processing apparatus which utilize 'bag-in-box' arrangements for both supplying solution to the processing apparatus and collecting effluent therefrom as described in our copending commonly assigned U.S. patent application Ser. No. 08/632, 992 filed concurrently herewith (corresponding to British patent application no. 9507845.7 filed Apr. 18, 1995, entitled 'Improvements in or Relating to the Handling of Solutions'), and incorporated herein by reference.

The present invention is applicable for use with any flexible container which has the ability to be overfilled by a predetermined amount.

PARTS LIST

10 . . . 'bag-in-box' arrangement
12,42 . . . 'dry-break' connector
14 . . . base
20 . . . processing apparatus
22 . . . processing tank
24 . . . processing solution
26 . . . level
30 . . . end
32 . . . waste pipe
40 . . . pipe
44 . . . 'U bend' portion
50 . . . chamber
52 . . . switch
54 . . . sensor
56 . . . inlet
58 . . . outlet
60 . . . transparent portion
62 . . . source of radiation
64 . . . optical sensor
66 . . . level
70 . . . transparent portion
72 . . . internal wall
74 . . . radiation source/sensor
76,78 . . . surfaces
80 . . . incident radiation
82 . . . beam
84 . . . solution
90 . . . internal wall
92 . . . incident radiation
94 . . . beam
96 . . . radiation
100 . . . portion
102,104 . . . metallic plates
106 . . . detector
110 . . . portion
112,114 . . . electrode members
116 . . . detector arrangement
120 . . . pressure-sensitive arrangement
122 . . . plate
122' . . . dotted lines
124 . . . bellows
126 . . . actuating arm
128 . . . microswitch
130 . . . member
132 . . . conduit
140 . . . arrangement
142 . . . coiled tube
144,146 . . . end
148 . . . pointer
150 . . . fixed scale
152 . . . arrow

We claim:

1. Processing apparatus comprising:
   (a) a first container arranged to supply a predetermined volume of processing solution to a processing tank;
   (b) a sealed flexible container comprising a "bag-in-box" arrangement having an outer liquid-tight container inside which a flexible bag is located;
   (c) an inlet pipe connected to the flexible container via a self sealing, dry-break connector for conducting effluent processing solution from the processing tank to the flexible container; and
   (d) an alarm system comprising a sensor arranged at a predetermined height h above the base of the sealed flexible container to provide an alarm signal when the level of the solution in the pipe has reached the height h to produce a pressure head determined by the height h corresponding to the flexible container being overfilled to a predetermined pressure.

2. Apparatus according to claim 1 wherein the sensor includes a chamber located in the pipe the chamber including a switch member which moves from a first normally open position to a second closed position when the flexible container has been overfilled by the predetermined amount.

3. Apparatus according to claim 2 wherein the switch member comprises a rocking arm solution level switch.

4. Apparatus according to claim 1 wherein the sensor comprises an optical sensor for sensing the level of solution in the pipe as an indication of the amount of overfill of the flexible container.

5. Apparatus according to claim 1 wherein the sensor comprises a capacitive sensor for sensing the level of solution in the pipe as an indication of the amount of overfill of the flexible container.

6. Apparatus according to claim 1 wherein the sensor comprises a conductive sensor for sensing the level of solution in the pipe as an indication of the amount of overfill of the flexible container.

7. Processing apparatus according to claim 1 wherein the sensor is located in the pipe.

8. Processing apparatus according to claim 1 wherein the pipe extends below the inlet of the sealed flexible container.

9. A processing method comprising:
(a) supplying a predetermined volume of processing solution to a processing tank from a first container;
(b) receiving effluent processing solution from the processing tank through an inlet pipe connected via a self sealing, dry-break connector to a sealed flexible container comprising a "bag-in-box" arrangement having an outer liquid-tight container inside which a flexible bag is located; and
(c) determining the level of effluent solution in the pipe and generating an alarm signal when the level of the solution in the pipe has reached a predetermined height h above the base of the sealed flexible container to produce a pressure head determined by height h corresponding to the flexible container being overfilled to a predetermined pressure.

10. An alarm system adapted for use with a flexible container used to collect effluent solution from a process, the flexible container comprising a "bag-in-box" arrangement having an outer liquid-tight container inside which a flexible bag is located, the system comprising pipe means for connecting the container to the process via a self sealing, dry-break connector and sensor means provided as part of the pipe means and arranged at a predetermined height h above the base of the sealed flexible container to produce a pressure head determined by height h corresponding to the flexible container being overfilled to a predetermined pressure for providing an alarm signal in response thereto.

11. A system according to claim 10 wherein the predetermined amount of overfill corresponds to a predetermined amount of excess solution collected from the process over the amount of solution supplied to the process.

12. A system according to claim 10 wherein the sensor includes a chamber located in the pipe, the chamber including a switch member which moves from a first normally open position to a second closed position when the flexible container has been overfilled by the predetermined amount of effluent solution.

13. A system according to claim 12 wherein the switch member comprises a rocking arm solution level switch.

14. A system according to claim 10 wherein the sensor comprises an optical sensor for sensing the level of solution in the pipe means.

15. A system according to claim 10 wherein the sensor comprises a capacitive sensor for sensing the level of solution in the pipe means.

16. A system according to claim 10 wherein the sensor comprises a conductive sensor for sensing the level of solution in the pipe means.

* * * * *